US008599179B2

(12) United States Patent
Kim et al.

(10) Patent No.: US 8,599,179 B2
(45) Date of Patent: Dec. 3, 2013

(54) SOURCE DRIVER INTEGRATED CIRCUIT WITH IMPROVED SLEW RATE

(75) Inventors: Ji Hun Kim, Daejeon-si (KR); Pyung Sik Ma, Daejeon-si (KR); Young Bok Kim, Busan-si (KR); Hyun Ho Cho, Incheon-si (KR); Joon Ho Na, Daejeon-si (KR)

(73) Assignee: Silicon Works Co., Ltd., Daejeon-Si (KR)

( * ) Notice: Subject to any disclaimer, the term of this patent is extended or adjusted under 35 U.S.C. 154(b) by 247 days.

(21) Appl. No.: 13/247,500

(22) Filed: Sep. 28, 2011

(65) Prior Publication Data

US 2012/0081338 A1 Apr. 5, 2012

(30) Foreign Application Priority Data

Oct. 1, 2010 (KR) ........................ 10-2010-0096047

(51) Int. Cl.
*G06F 3/038* (2013.01)

(52) U.S. Cl.
USPC ............................ 345/204; 345/211; 345/214

(58) Field of Classification Search
USPC .............. 345/76, 78, 204, 211, 212, 214, 215
See application file for complete search history.

(56) References Cited

U.S. PATENT DOCUMENTS

| | | | | |
|---|---|---|---|---|
| 7,952,553 | B2 * | 5/2011 | Yoon-Kyung | 345/100 |
| 2006/0038764 | A1 * | 2/2006 | Takahashi et al. | 345/100 |
| 2006/0279356 | A1 * | 12/2006 | An | 330/253 |
| 2008/0180174 | A1 * | 7/2008 | Kim et al. | 330/253 |
| 2008/0278473 | A1 * | 11/2008 | An | 345/214 |
| 2010/0097142 | A1 * | 4/2010 | Liang et al. | 330/277 |
| 2010/0134471 | A1 * | 6/2010 | Seo et al. | 345/212 |
| 2010/0149171 | A1 * | 6/2010 | Huang et al. | 345/214 |
| 2010/0164929 | A1 * | 7/2010 | Chen et al. | 345/211 |
| 2010/0265274 | A1 * | 10/2010 | Han et al. | 345/690 |
| 2011/0050677 | A1 * | 3/2011 | Tsai et al. | 345/213 |
| 2011/0063200 | A1 * | 3/2011 | An | 345/98 |

* cited by examiner

*Primary Examiner* — Joe H Cheng
(74) *Attorney, Agent, or Firm* — Kile Park Reed & Houtteman PLLC

(57) ABSTRACT

Disclosed is a source driver integrated circuit with an improved slew rate by disposing a switching unit, which operates as a resistance component during display driving, before the feedback line of an output buffer. According to the source driver integrated circuit with an improved slew rate, a switching unit, which operates as a resistance component when a signal is transferred, is disposed in the feedback loop of an output buffer, so that the resistance component is not shown to a panel load, thereby improving the slew rate of an output signal. In addition, the improved slew rate makes it possible to easily implement an image through a display.

10 Claims, 4 Drawing Sheets

SOURCE DRIVER INTEGRATED CIRCUIT WITH IMPROVED SLEW RATE

BACKGROUND OF THE INVENTION

1. Field of the Invention

The present invention relates to a source driver integrated circuit, and more particularly, to a source driver integrated circuit with an improved slew rate wherein a switching unit operating as a resistance component in a procedure of transferring an output signal of an output buffer to a panel load is disposed in a feedback line loop of the output buffer, and thus the slew rate of the output signal can be improved.

2. Description of the Related Art

FIG. 1 is a view illustrating a connection structure of a panel and a conventional source driver IC in a liquid crystal display.

As illustrated in FIG. 1, a conventional source driver IC 100 of a liquid crystal display includes a digital-to-analog converter (DAC) unit 110 configured to convert digital data including an RGB signal into analog data and to output the analog data, an output buffer unit (e.g. amplifier) 120 configured to transfer the output of the DAC unit 110, and a pad unit 130 configured to output analog data which is outputted from the output buffer unit 120.

Meanwhile, the analog data outputted from the output buffer unit 120 passes through the pad unit 130, and then is transferred to a panel 200 via data lines 140.

In this case, digital data including an R signal is inputted through a first data line DL1, is converted into analog data by a first digital-to-analog converter 111, and then passes through a first output buffer 121 and a first pad 131, so that the analog data including the R signal is inputted to a first panel load 210 of the panel 200, and thus the panel 200 is driven with R data.

In the same sequence as described above, G analog data is inputted to a second data line DL2, and B analog data is inputted to a third data line DL3, so that data lines are driven in the RGB sequence.

FIG. 2 is a detailed view of a part of the conventional source driver IC in a liquid crystal display, illustrated in FIG. 1.

As illustrated in FIG. 2, the outputs of a first output buffer 121 and a second output buffer 122 in the conventional source driver IC of the liquid crystal display pass through a switching unit 150, and are outputted to a first panel load 210 and a second panel load 220 through data lines DL1 and DL2, respectively.

In a first driving mode, the first digital-to-analog converter 111 outputs and transfers a first polarity voltage having a positive polarity to the first output buffer 121, and a second digital-to-analog converter 112 outputs and transfers a second polarity voltage having a negative polarity to the second output buffer 122.

Subsequently, a 1-1$^{st}$ switch SW1-1 and a 2-1$^{st}$ switch SW2-1 in the switching unit 150 are turned on, while a 1-2$^{nd}$ switch SW1-2, a 2-2$^{nd}$ switch SW2-2, and a charge-sharing switch SW3 are turned off. Accordingly, the output signal of the first output buffer 121 is transferred to the first panel load 210 through the 1-1$^{st}$ switch SW1-1 and the first data line DL1, and the output signal of the second output buffer 122 is transferred to the second panel load 220 through the 2-1$^{st}$ switch SW2-1 and the second data line DL2.

In a first charge-sharing mode, a charge-sharing process is performed to reduce power consumption caused when the polarity is reversed between the data lines DL1 and DL2. In this case, the 1-1$^{st}$ switch SW1-1, the 1-2$^{nd}$ switch SW1-2, the 2-1$^{st}$ switch SW2-1, and the 2-2$^{nd}$ switch SW2-2 are turned off, while the charge-sharing switch SW3 is turned on. Accordingly, the first panel load 210 receiving the output signal of the first output buffer 121 and the second panel load 220 receiving the output signal of the second output buffer 122 share charges, which are accumulated in the respective panel loads 210 and 220, through the charge-sharing switch SW3.

In a second driving mode, the 1-1$^{st}$ switch SW1-1, the 2-1$^{st}$ switch SW2-1, and the charge-sharing switch SW3 in the switching unit 150 are turned off, while the 1-2$^{nd}$ switch SW1-2 and the 2-2$^{nd}$ switch SW2-2 are turned on.

Accordingly, the output signal of the first output buffer 121 is transferred to the second panel load 220 through the 1-2$^{nd}$ switch SW1-2 and the second data line DL2, and the output signal of the second output buffer 122 is transferred to the first panel load 210 through the 2-2$^{nd}$ switch SW2-2 and the first data line DL1.

In a second charge-sharing mode, charges accumulated in the respective panel loads 210 and 220 are again shared. That is to say, the 1-1$^{st}$ switch SW1-1, the 1-2$^{nd}$ switch SW1-2, the 2-1$^{st}$ switch SW2-1, and the 2-2$^{nd}$ switch SW2-2 are turned off, while the charge-sharing switch SW3 is turned on. Accordingly, the first panel load 210 and the second panel load 220 share charges, which are accumulated in the respective panel loads 210 and 220, through the charge-sharing switch SW3.

The source driver IC drives the liquid crystal display while repeating the operations from the first driving mode to the second charge-sharing mode, as described above.

FIG. 3 is a view explaining a problem in the feedback structure of the conventional source driver IC.

Generally, in a source driver IC, the switching unit 150 performing a switching operation for an output signal operates as a resistance component when transferring an output signal from the output buffers 121 and 122 to the panel loads 210 and 220. Therefore, the feedback structure of the source driver IC illustrated in FIG. 3(*a*) may be simplified and expressed as FIG. 3(*b*).

Referring to FIGS. 3(*a*) and 3(*b*), it can be understood that, in the feedback structure of the conventional source driver IC, the switching unit 150 operating as a resistance component is disposed outside the feedback line (FL) loop of the output buffers 121 and 122.

Accordingly, the switching unit biased toward the panel load operates as a resistor, so that the slow rate of an output signal transferred to the panel load is reduced. In addition, the reduced slew rate makes it impossible to easily implement an image through the display.

SUMMARY OF THE INVENTION

Accordingly, the present invention has been made in an effort to solve the problems occurring in the related art, and an object of the present invention is to provide a source driver integrated circuit with an improved slew rate wherein a switching unit operating as a resistance component in a procedure of transferring an output signal of an output buffer to a panel load is disposed in a feedback line loop of the output buffer, and thus the slew rate of the output signal can be improved.

In order to achieve the above object, according to one aspect of the present invention, there is provided a source driver integrated circuit with an improved slew rate comprising: a plurality of first digital-to-analog converters configured to output first polarity voltages; a plurality of second digital-to-analog converters configured to output second polarity voltages; a plurality of first output buffers configured to receive signals outputted from the first digital-to-analog converters, and to either drive a plurality of first panel loads through a plurality of first data lines or to drive a plurality of second panel loads through a plurality of second data lines; a plurality of second output buffers configured to receive signals outputted from the second digital-to-analog converters, and to either drive the plurality of second panel loads through the plurality of second data lines or to drive the plurality of first panel loads through the plurality of first data lines; a first switching unit configured to select one of outputs of the first output buffer and the second output buffer, and to transfer the selected output to the first panel load or the second panel load, respectively; a second switching unit configured to feed the output of the first output buffer and the output of the second output buffer, which have been transferred through the first switching unit, back to the first output buffer and the second output buffer, respectively; and a charge-sharing switch configured to have a first terminal connected to the first data line and a second terminal connected to the second data line.

In order to achieve the above object, according to another aspect of the present invention, there is provided a source driver integrated circuit with an improved slew rate comprising: a first output buffer configured to output a first polarity voltage; a second output buffer configured to output a second polarity voltage; a first switching unit configured to be connected to an output terminal of the first output buffer, an output terminal of the second output buffer, a first data line connected to a first panel load, and a second data line connected to a second panel load; and a second switching unit configured to be disposed among the first switching unit, the first panel load, and the second panel load, and to be connected to a first feedback line connected to an input terminal of the first output buffer, a second feedback line connected to an input terminal of the second output buffer, the first data line, and the second data line, wherein: in a first driving mode, the first switching unit connects the output terminal of the first output buffer to the first data line and connects the output terminal of the second output buffer to the second data line, and the second switching unit connects the first feedback line to the first data line and connects the second feedback line to the second data line; and in a second driving mode, the first switching unit connects the output terminal of the first output buffer to the second data line and connects the output terminal of the second output buffer to the first data line, and the second switching unit connects the first feedback line to the second data line and connects the second feedback line to the first data line.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Figure 1:
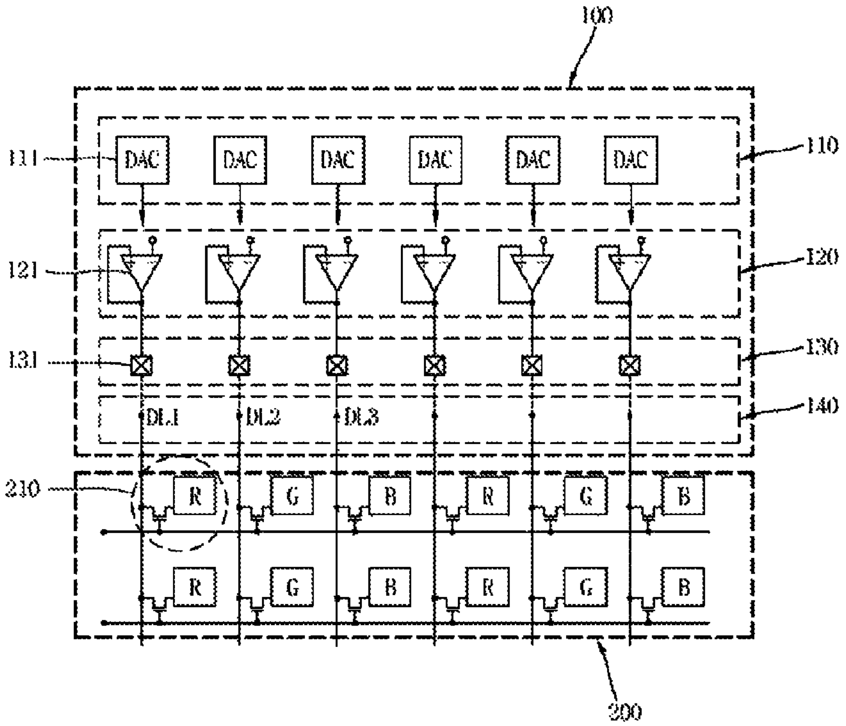
Fig.1 (Prior Art)
FIG. 1 is a view illustrating a connection structure of a panel and a conventional source driver IC in a liquid crystal display.
Figure 2:
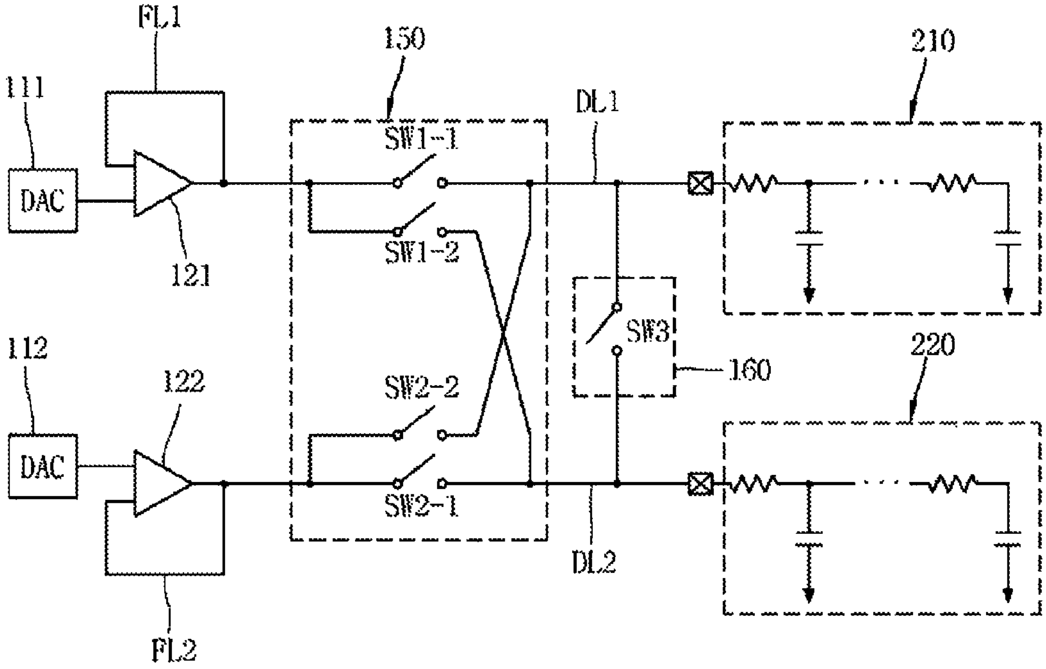
Fig.2 (Prior Art)
FIG. 2 is a detailed view of a part of the conventional source driver IC in a liquid crystal display, illustrated in FIG. 1.
Figure 3:
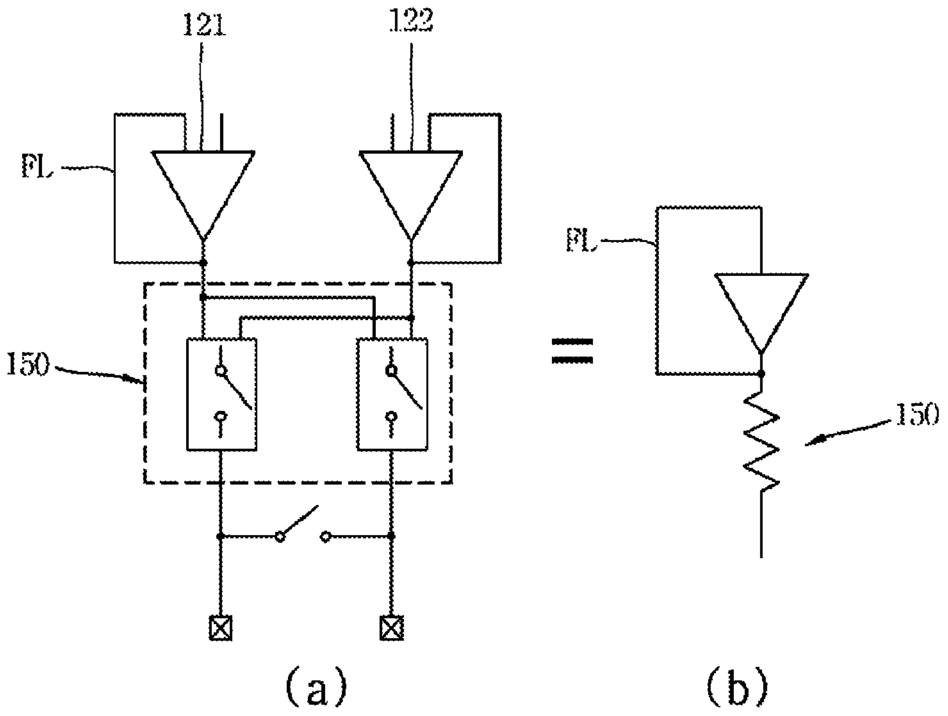
Fig.3 (Prior Art)
FIG. 3 is a view explaining a problem in the feedback structure of the conventional source driver IC.

Reference will now be made in greater detail to preferred embodiments of the invention, examples of which are illustrated in the accompanying drawings. Wherever possible, the same reference numerals will be used throughout the drawings and the description to refer to the same or like parts.

Figure 4:
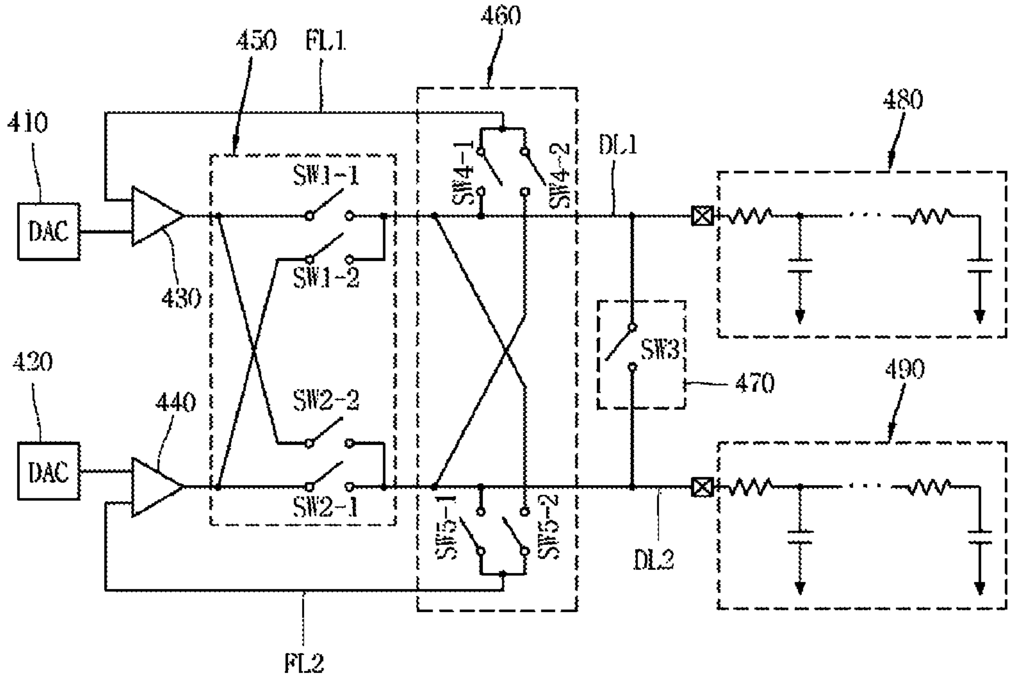
FIG. 4 is a view illustrating the configuration of a source driver integrated circuit with an improved slew rate according to an embodiment of the present invention.

FIG. 4 is a view illustrating the configuration of a source driver integrated circuit with an improved slew rate according to an embodiment of the present invention.

As illustrated in FIG. 4, a source driver integrated circuit with an improved slew rate according to an embodiment of the present invention includes a first digital-to-analog converter 410, a second digital-to-analog converter 420, a first output buffer 430, a second output buffer 440, a first switching unit 450, a second switching unit 460, and a charge-sharing switch 470.

The first digital-to-analog converter 410 outputs a first polarity voltage having a positive polarity, and the second digital-to-analog converter 420 outputs a second polarity voltage having a negative polarity.

For convenience of description, the following description will be given on a case where the first polarity voltage has the positive polarity and the second polarity voltage has the negative polarity, but the opposite case is also possible.

The first output buffer 430 receives a signal outputted from the first digital-to-analog converter 410, and drives a first panel load 480 of a display panel through a first data line DL1. The second output buffer 440 receives a signal outputted from the second digital-to-analog converter 420, and drives a second panel load 490 of the display panel through a second data line DL2. Here, the display panel includes panels, such as a liquid crystal display (LCD) panel, an organic light emitting diodes (OLED) panel, etc., which are used in flat panel display devices.

The first switching unit 450 selects one of the outputs of the first output buffer 430 and second output buffer 440, and transfers the selected output to the first panel load 480 or second panel load 490.

The first switching unit 450 includes four switches, i.e. a 1-1$^{st}$ switch SW1-1, a 1-2$^{nd}$ switch SW1-2, a 2-1$^{st}$ switch SW2-1, and a 2-2$^{nd}$ switch SW2-2.

A first terminal of the 1-1$^{st}$ switch SW1-1 is connected to the output terminal of the first output buffer 430, and a second terminal of the 1-1$^{st}$ switch SW1-1 is connected to the first data line DL1. A first terminal of the 1-2$^{nd}$ switch SW1-2 is connected to the output terminal of the second output buffer 440, and a second terminal of the 1-2$^{nd}$ switch SW1-2 is connected to the first data line DL1.

A first terminal of the 2-1$^{st}$ switch SW2-1 is connected to the output terminal of the second output buffer 440, and a second terminal of the 2-1$^{st}$ switch SW2-1 is connected to the second data line DL2. A first terminal of the 2-2$^{nd}$ switch SW2-2 is connected to the output terminal of the first output buffer 430, and a second terminal of the 2-2$^{nd}$ switch SW2-2 is connected to the second data line DL2.

In this case, the 1-1$^{st}$ switch SW1-1 and the 1-2$^{nd}$ switch SW1-2 operate complementarily to each other, and the 2-1$^{st}$ switch SW2-1 and the 2-2$^{nd}$ switch SW2-2 operate complementarily to each other. That is to say, when the 1-1$^{st}$ switch SW1-1 is turned on, the 1-2$^{nd}$ switch SW1-2 is turned off; and when the 2-1$^{st}$ switch SW2-1 is turned on, the 2-2$^{nd}$ switch SW2-2 is turned off.

In addition, the 1-1$^{st}$ switch SW1-1 and the 2-1$^{st}$ switch SW2-1 are simultaneously turned on or off, and the 1-2$^{nd}$ switch SW1-2 and the 2-2$^{nd}$ switch SW2-2 are simultaneously turned on or off, too.

Meanwhile, the second switching unit 460 feeds the output of the first output buffer 430 and the output of the second output buffer 440, which have been transferred through the first switching unit 450, back to the first output buffer 430 and the second output buffer 440 through a first feedback line FL1 and a second feedback line FL2, respectively, which are connected to an input terminal of the first output buffer 430 and an input terminal of the second output buffer 440, respectively.

The second switching unit 460 includes four switches, i.e. a 4-1$^{st}$ switch SW4-1, a 4-2$^{nd}$ switch SW4-2, a 5-1$^{st}$ switch SW5-1, and a 5-2$^{nd}$ switch SW5-2.

A first terminal of the 4-1$^{st}$ switch SW4-1 is connected to the first data line DL1, and a second terminal of the 4-1$^{st}$ switch SW4-1 is connected to the first feedback line FL1, which is connected to the input terminal of the first output buffer 430. Meanwhile, a first terminal of the 4-2$^{nd}$ switch SW4-2 is connected to the second data line DL2, and a second terminal of the 4-2$^{nd}$ switch SW4-2 is connected to the first feedback line FL1.

A first terminal of the 5-1$^{st}$ switch SW5-1 is connected to the second data line DL2, and a second terminal of the 5-1$^{st}$ switch SW5-1 is connected to the second feedback line FL2, which is connected to the input terminal of the second output buffer 440. Meanwhile, a first terminal of the 5-2$^{nd}$ switch SW5-2 is connected to the first data line DL1, and a second terminal of the 5-2$^{nd}$ switch SW5-2 is connected to the second feedback line FL2.

In this case, the 4-1$^{st}$ switch SW4-1 and the 4-2$^{nd}$ switch SW4-2 operate complementarily to each other, and the 5-1$^{st}$ switch SW5-1 and the 5-2$^{nd}$ switch SW5-2 operate complementarily to each other. That is to say, when the 4-1$^{st}$ switch SW4-1 is turned on, the 4-2$^{nd}$ switch SW4-2 is turned off; and when the 5-1$^{st}$ switch SW5-1 is turned on, the 5-2$^{nd}$ switch SW5-2 is turned off.

In addition, the 4-1$^{st}$ switch SW4-1 and the 5-1$^{st}$ switch SW5-1 are simultaneously turned on or off, and the 4-2$^{nd}$ switch SW4-2 and 5-2$^{nd}$ switch SW5-2 are simultaneously turned on or off, too.

A first terminal of the charge-sharing switch 470 is connected to the first data line DL1, and a second terminal of the charge-sharing switch 470 is connected to the second data line DL2.

The charge-sharing switch 470 is turned off in a display driving mode, and is turned on in a charge-sharing mode. In this case, the first panel load 480 and the second panel load 490 share charges accumulated in the respective panel loads.

According to an embodiment of the present invention, the source driver integrated circuit with an improved slew rate has a structure in which the first switching unit 450 operating as a resistance component is located in the loop of the first feedback line FL1 and second feedback line FL2, thereby reducing the resistance component of the first switching unit 450 during the operation of the source driver integrated circuit.

Hereinafter, the operation of the source driver integrated circuit with an improved slew rate according to an embodiment of the present invention will be described with reference to FIGS. 5 to 7.

Figure 5:
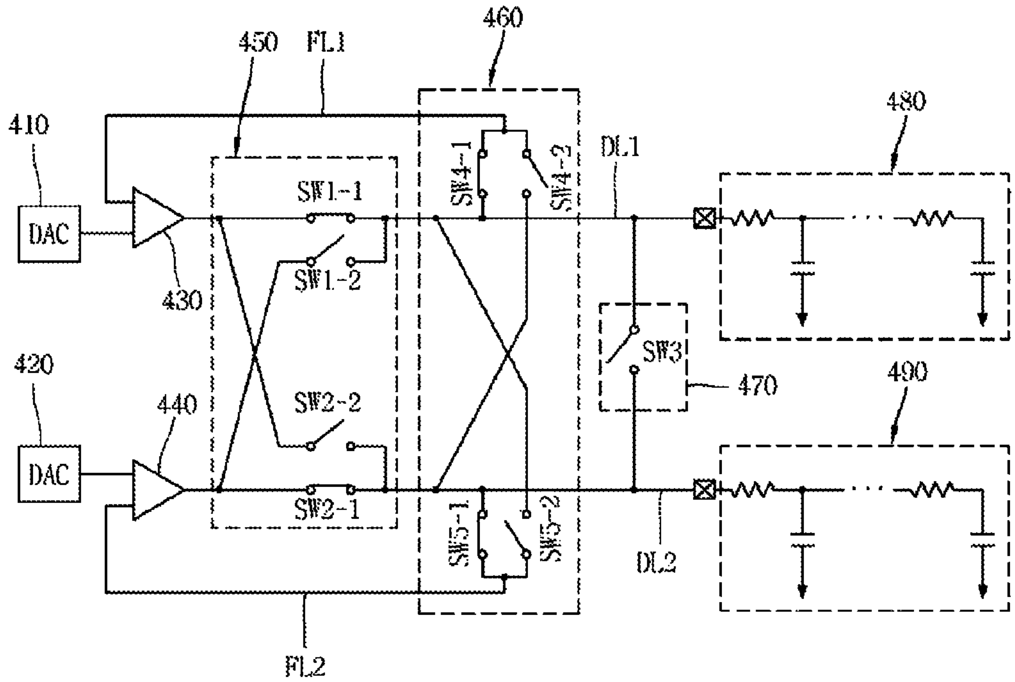
FIG. 5 is a view illustrating an operation of the source driver integrated circuit with an improved slew rate in a first driving mode according to an embodiment of the present invention.

FIG. 5 is a view illustrating an operation of the source driver integrated circuit with an improved slew rate in a first driving mode according to an embodiment of the present invention.

As illustrated in FIG. 5, in the first driving mode, the first output buffer 430 receives a signal having a first polarity voltage outputted from the first digital-to-analog converter 410 and drives the first panel load 480, and the second output buffer 440 receives a signal having a second polarity voltage outputted from the second digital-to-analog converter 420 and drives the second panel load 490.

In this case, the 1-1$^{st}$ switch SW1-1 and 2-1$^{st}$ switch SW2-1 of the first switching unit 450 are turned on, and the 1-2$^{nd}$ switch SW1-2 and 2-2$^{nd}$ switch SW2-2 are turned off. That is to say, the switching of the 1-1$^{st}$ switch SW1-1 and the 1-2$^{nd}$ switch SW1-2 is controlled complementarily to each other, and the switching of the 2-1$^{st}$ switch SW2-1 and the 2-2$^{nd}$ switch SW2-2 is controlled complementarily to each other. Accordingly, the output of the first output buffer 430 is transferred along the first data line DL1 through the 1-1$^{st}$ switch SW1-1, and the output of the second output buffer 440 is transferred along the second data line DL2 through the 2-1$^{st}$ switch SW2-1.

Thereafter, the second switching unit 460 which controls the connections of the feedback lines FL1 and FL2 operates.

In this case, the 4-1$^{st}$ switch SW4-1 and 5-1$^{st}$ switch SW5-1 of the second switching unit 460 are turned on, and the 4-2$^{nd}$ switch SW4-2 and 5-2$^{nd}$ switch SW5-2 are turned off. That is to say, the switching of the 4-1$^{st}$ switch SW4-1 and 4-2$^{nd}$ switch SW4-2 is controlled complementarily to each other, and the switching of the 5-1$^{st}$ switch SW5-1 and 5-2$^{nd}$ switch SW5-2 is controlled complementarily to each other. Accordingly, the output of the first output buffer 430 is fed back to an input terminal of the first output buffer 430 along the first feedback line FL1 through the 4-1$^{st}$ switch SW4-1, and the output of the second output buffer 440 is fed back to an input terminal of the second output buffer 440 along the second feedback line FL2 through the 5-1$^{st}$ switch SW5-1.

As described above, by the switching operations of the first switching unit 450 and second switching unit 460, the outputs of the first output buffer 430 and second output buffer 440 are transferred to the panel loads 480 and 490 through the data lines DL1 and DL2, and are fed back to input terminals of the output buffers 430 and 440 through the feedback lines FL1 and FL2.

While the output of the first output buffer 430 is being transferred to the first panel load 480, and the output of the second output buffer 440 is being transferred to the second panel load 490, the charge-sharing switch SW3 is maintained in a turn-off state.

Figure 6:
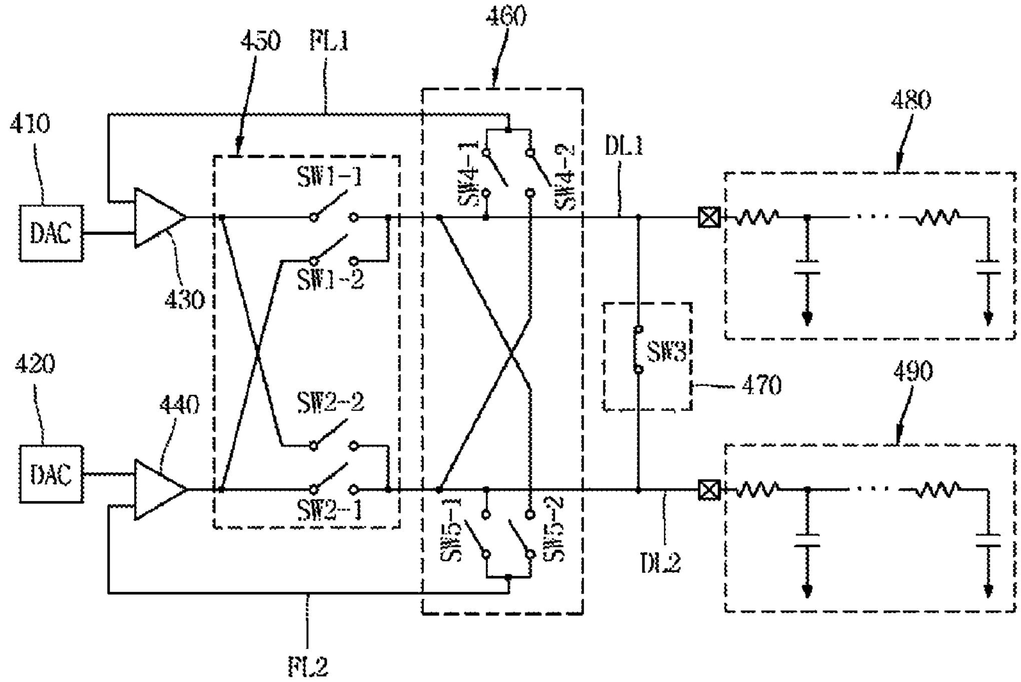
FIG. 6 is a view illustrating an operation of the source driver integrated circuit with an improved slew rate in a first charge-sharing mode according to an embodiment of the present invention.

FIG. 6 is a view illustrating an operation of the source driver integrated circuit with an improved slew rate in a first charge-sharing mode according to an embodiment of the present invention.

As illustrated in FIG. 6, in the first charge-sharing mode, first, the 1-1$^{st}$ switch SW1-1 and 2-1$^{st}$ switch SW2-1 of the first switching unit 450 and the 4-1$^{st}$ switch SW4-1 and 5-1$^{st}$ switch SW5-1 of the second switching unit 460, which have been turned on, are turned off. Thereafter, the charge-sharing switch SW3 is turned on, so that the first panel load 480 having received the output of the first output buffer 430 and the second panel load 490 having received the output of the second output buffer 440 share charges through the charge-sharing switch SW3.

Figure 7:
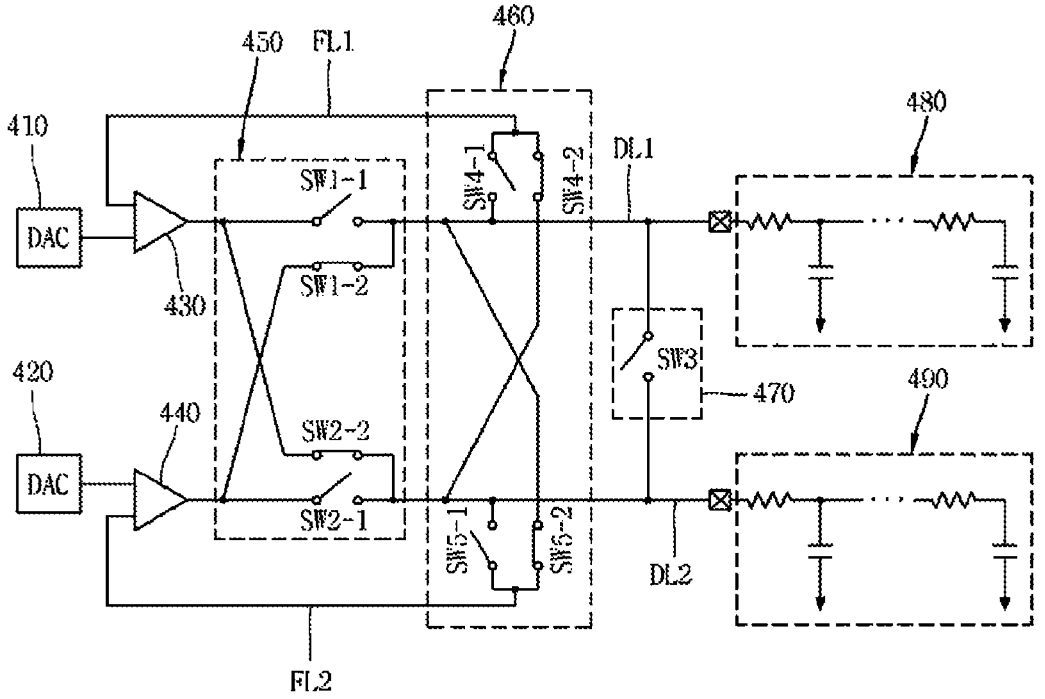
FIG. 7 is a view illustrating an operation of the source driver integrated circuit with an improved slew rate in a second driving mode according to an embodiment of the present invention.

FIG. 7 is a view illustrating an operation of the source driver integrated circuit with an improved slew rate in a second driving mode according to an embodiment of the present invention.

As illustrated in FIG. 7, in the second driving mode, the first output buffer 430 receives a signal having a first polarity voltage outputted from the first digital-to-analog converter 410 and drives the second panel load 490, and the second output buffer 440 receives a signal having a second polarity voltage outputted from the second digital-to-analog converter 420 and drives the first panel load 480.

In this case, the 1-$2^{nd}$ switch SW1-2 and 2-$2^{nd}$ switch SW2-2 of the first switching unit 450 are turned on, and the 1-$1^{st}$ switch SW1-1 and 2-1$^{st}$ switch SW2-1 are turned off. That is to say, the switching of the 1-$1^{st}$ switch SW1-1 and the 1-$2^{nd}$ switch SW1-2 is controlled complementarily to each other, and the switching of the 2-$1^{st}$ switch SW2-1 and the 2-$2^{nd}$ switch SW2-2 is controlled complementarily to each other.

Accordingly, the output of the first output buffer 430 is transferred to the second panel load 490 along the second data line DL2 through the 2-$2^{nd}$ switch SW2-2, and the output of the second output buffer 440 is transferred to the first panel load 480 along the first data line DL1 through the 1-$2^{nd}$ switch SW1-2.

Thereafter, the second switching unit 460 which controls the connections of the feedback lines FL1 and FL2 operates.

In this case, the 4-$2^{nd}$ switch SW4-2 and 5-$2^{nd}$ switch SW5-2 of the second switching unit 460 are turned on, and the 4-$1^{st}$ switch SW4-1 and 5-$1^{st}$ switch SW5-1 are turned off. That is to say, the switching of the 4-$1^{st}$ switch SW4-1 and 4-$2^{nd}$ switch SW4-2 is controlled complementarily to each other, and the switching of the 5-$1^{st}$ switch SW5-1 and 5-$2^{nd}$ switch SW5-2 is controlled complementarily to each other.

Accordingly, the output of the first output buffer 430, which has been transferred through the 2-$2^{nd}$ switch SW2-2, is fed back to an input terminal of the first output buffer 430 along the first feedback line FL1 through the 4-$2^{nd}$ switch SW4-2; and the output of the second output buffer 440, which has been transferred through the 1-$2^{nd}$ switch SW1-2, is fed back to an input terminal of the second output buffer 440 along the second feedback line FL2 through the 5-$2^{nd}$ switch SW5-2.

As described above, by the switching operations of the first switching unit 450 and second switching unit 460, the outputs of the first output buffer 430 is transferred to the second panel load 490, and the output of the second output buffer 440 is transferred to the first panel load 480. Accordingly, differently from in the first driving mode, the first panel load 480 and the second panel load 490 receive output signals having reversed polarities.

While the output of the first output buffer 430 is being transferred to the second panel load 490, and the output of the second output buffer 440 is being transferred to the first panel load 480, the charge-sharing switch SW3 is maintained in a turn-off state.

Thereafter, a second charge-sharing mode is performed, so that the charge-sharing switch SW3 is turned on while the other switches are all turned off. In this case, the second panel load 490 having received the output of the first output buffer 430 and the first panel load 480 having received the output of the second output buffer 440 share charges through the charge-sharing switch SW3.

By repeating the operations from the first driving mode to the second charge-sharing mode, as described above, it is possible to implement an image through the display.

Figure 8:
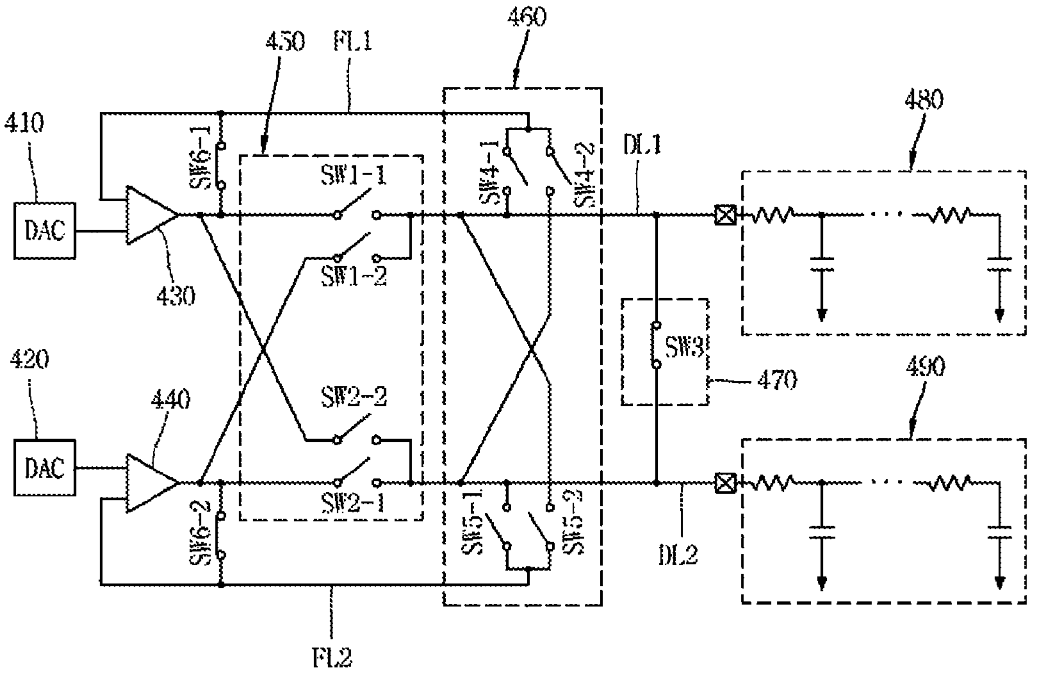
FIG. 8 is a view illustrating the configuration of a source driver integrated circuit with an improved slew rate according to another embodiment of the present invention.

FIG. 8 is a view illustrating the configuration of a source driver integrated circuit with an improved slew rate according to another embodiment of the present invention.

As illustrated in FIG. 8, according to another embodiment of the present invention, the source driver integrated circuit with an improved slew rate further includes a first-output-buffer voltage stabilization switch SW6-1 and a second-output-buffer voltage stabilization switch SW6-2.

A first terminal of the first-output-buffer voltage stabilization switch SW6-1 is connected to the output terminal of the first output buffer 430, and a second terminal of the first-output-buffer voltage stabilization switch SW6-1 is connected to the first feedback line FL1.

A first terminal of the second-output-buffer voltage stabilization switch SW6-2 is connected to the output terminal of the second output buffer 440, and a second terminal of the second-output-buffer voltage stabilization switch SW6-2 is connected to the second feedback line FL2.

The first-output-buffer voltage stabilization switch SW6-1 and second-output-buffer voltage stabilization switch SW6-2 aim at stabilizing the DC biases of the first output buffer 430 and second output buffer 440, and are simultaneously turned on or off.

Meanwhile, the operations of source driver integrated circuit in the first driving mode and second driving mode illustrated in FIG. 8 are the same as described with reference to FIGS. 5 and 7. In this case, the first-output-buffer voltage stabilization switch SW6-1 and the second-output-buffer voltage stabilization switch SW6-2 are in a turn-off state.

In the first and second charge-sharing modes, the first-output-buffer voltage stabilization switch SW6-1 and second-output-buffer voltage stabilization switch SW6-2 are maintained in a turn-on state, like the charge-sharing switch SW3, and operate to stabilize the DC biases of the first output buffer 430 and second output buffer 440.

The source driver integrated circuits according to the embodiments of the present invention can be used not only in an LCD panel requiring a polarity reversal but also in a flat panel display device, such as an OLED, which require a switching unit at the output terminal of an output buffer therein. For example, in a case where it is necessary to separate the output terminal of an output buffer from a panel load in order to sense a specific state of a panel, in a case where it is necessary to separate the output terminal of an output buffer from a panel load in order to apply a large current to a panel load, etc., the source driver integrated circuit according to the present invention can be used in a flat panel display device.

As is apparent from the above description, the present invention provides a source driver integrated circuit with an improved slew rate in which a switching unit, that operates as a resistance component when a signal is transferred, is disposed in the feedback loop of an output buffer, so that the resistance component is not shown to a panel load, thereby improving the slew rate of an output signal. In addition, the improved slew rate makes it possible to easily implement an image through a display.

Although preferred embodiments of the present invention have been described for illustrative purposes, those skilled in the art will appreciate that various modifications, additions and substitutions are possible, without departing from the scope and the spirit of the invention as disclosed in the accompanying claims.

What is claimed is:

1. A source driver integrated circuit with an improved slew rate comprising:

a plurality of first digital-to-analog converters configured to output first polarity voltages;

a plurality of second digital-to-analog converters configured to output second polarity voltages;

a plurality of first output buffers configured to receive signals outputted from the first digital-to-analog converters, and to either drive a plurality of first panel loads through a plurality of first data lines or to drive a plurality of second panel loads through a plurality of second data lines;

a plurality of second output buffers configured to receive signals outputted from the second digital-to-analog converters, and to either drive the plurality of second panel loads through the plurality of second data lines or to drive the plurality of first panel loads through the plurality of first data lines;

a first switching unit configured to select one of outputs of the first output buffer and the second output buffer, and to transfer the selected output to the first panel load or the second panel load, respectively;

a second switching unit configured to feed the output of the first output buffer and the output of the second output buffer, which have been transferred through the first switching unit, back to the first output buffer and the second output buffer, respectively; and a charge-sharing switch configured to have a first terminal connected to the first data line and a second terminal connected to the second data line.

2. The source driver integrated circuit with an improved slew rate according to claim 1, wherein the first switching unit comprises:

a 1-1$^{st}$ switch configured to have a first terminal connected to an output terminal of the first output buffer and a second terminal connected to the first data line;

a 1-2$^{nd}$ switch configured to have a first terminal connected to an output terminal of the second output buffer and a second terminal connected to the first data line;

a 2-1$^{st}$ switch configured to have a first terminal connected to the output terminal of the second output buffer and a second terminal connected to the second data line; and a 2-2$^{nd}$ switch configured to have a first terminal connected to the output terminal of the first output buffer and a second terminal connected to the second data line.

3. The source driver integrated circuit with an improved slew rate according to claim 2, wherein the 1-1$^{st}$ switch and the 1-2$^{nd}$ switch operate complementarily to each other, and the 2-1$^{st}$ switch and the 2-2$^{nd}$ switch operate complementarily to each other.

4. The source driver integrated circuit with an improved slew rate according to claim 3, wherein the second switching unit comprises:

a 4-1$^{st}$ switch configured to have a first terminal connected to the first data line and a second terminal connected to a feedback line of the first output buffer;

a 4-2$^{nd}$ switch configured to have a first terminal connected to the second data line and a second terminal connected to the feedback line of the first output buffer;

a 5-1$^{st}$ switch configured to have a first terminal connected to the second data line and a second terminal connected to a feedback line of the second output buffer; and a 5-2$^{nd}$ switch configured to have a first terminal connected to the first data line and a second terminal connected to the feedback line of the second output buffer.

5. The source driver integrated circuit with an improved slew rate according to claim 4, wherein the 4-1$^{st}$ switch and the 4-2$^{nd}$ switch operate complementarily to each other, and the 5-1$^{st}$ switch and the 5-2$^{nd}$ switch operate complementarily to each other.

6. The source driver integrated circuit with an improved slew rate according to claim 1, further comprising:

a first-output-buffer voltage stabilization switch configured to have a first terminal connected to an output terminal of the first output buffer and a second terminal connected to a feedback line of the first output buffer; and a second-output-buffer voltage stabilization switch configured to have a first terminal connected to an output terminal of the second output buffer and a second terminal connected to a feedback line of the second output buffer.

7. The source driver integrated circuit with an improved slew rate according to claim 6, wherein the first-output-buffer voltage stabilization switch and the second-output-buffer voltage stabilization switch are simultaneously turned on or off.

8. The source driver integrated circuit with an improved slew rate according to claim 5, wherein, when the 1-1$^{st}$ switch, 2-1$^{st}$ switch, 4-1$^{st}$ switch, and 5-1$^{st}$ switch are turned on, an output of the first output buffer is transferred to the first panel load and is fed back to the first output buffer, and an output of the second output buffer is transferred to the second panel load and is fed back to the second output buffer.

9. The source driver integrated circuit with an improved slew rate according to claim 8, wherein, when the 1-2$^{nd}$ switch, 2-2$^{nd}$ switch, 4-2$^{nd}$ switch, and 5-2$^{nd}$ switch are turned on, the output of the first output buffer is transferred to the second panel load and is fed back to the first output buffer, and the output of the second output buffer is transferred to the first panel load and is fed back to the second output buffer.

10. A source driver integrated circuit with an improved slew rate comprising:

a first output buffer configured to output a first polarity voltage;

a second output buffer configured to output a second polarity voltage;

a first switching unit configured to be connected to an output terminal of the first output buffer, an output terminal of the second output buffer, a first data line connected to a first panel load, and a second data line connected to a second panel load; and a second switching unit configured to be disposed among the first switching unit, the first panel load, and the second panel load, and to be connected to a first feedback line connected to an input terminal of the first output buffer, a second feedback line connected to an input terminal of the second output buffer, the first data line, and the second data line, wherein: in a first driving mode, the first switching unit connects the output terminal of the first output buffer to the first data line and connects the output terminal of the second output buffer to the second data line, and the second switching unit connects the first feedback line to the first data line and connects the second feedback line to the second data line; and in a second driving mode, the first switching unit connects the output terminal of the first output buffer to the second data line and connects the output terminal of the second output buffer to the first data line, and the second switching unit connects the first feedback line to the second data line and connects the second feedback line to the first data line.

* * * * *